(No Model.) 2 Sheets—Sheet 2.

S. W. PARKER & H. BLACKMAN.
PROCESS OF DISINFECTING BALED RAGS, &c.

No. 311,360. Patented Jan. 27, 1885.

UNITED STATES PATENT OFFICE.

SAMUEL WEBBER PARKER AND HENRY BLACKMAN, OF NEW YORK, N. Y.

PROCESS OF DISINFECTING BALED RAGS, &c.

SPECIFICATION forming part of Letters Patent No. 311,360, dated January 27, 1885.

Application filed October 23, 1884. (No m del.)

*To all whom it may concern:*

Be it known that we, SAMUEL WEBBER PARKER and HENRY BLACKMAN, of New York, in the county of New York, and in the State of New York, have invented certain new and useful Improvements in Processes of Disinfecting Rags and other Fibrous Materials; and we do hereby declare that the following is a full, clear, and exact description of the invention, reference being had to the accompanying drawings, in which—

Figure 1:
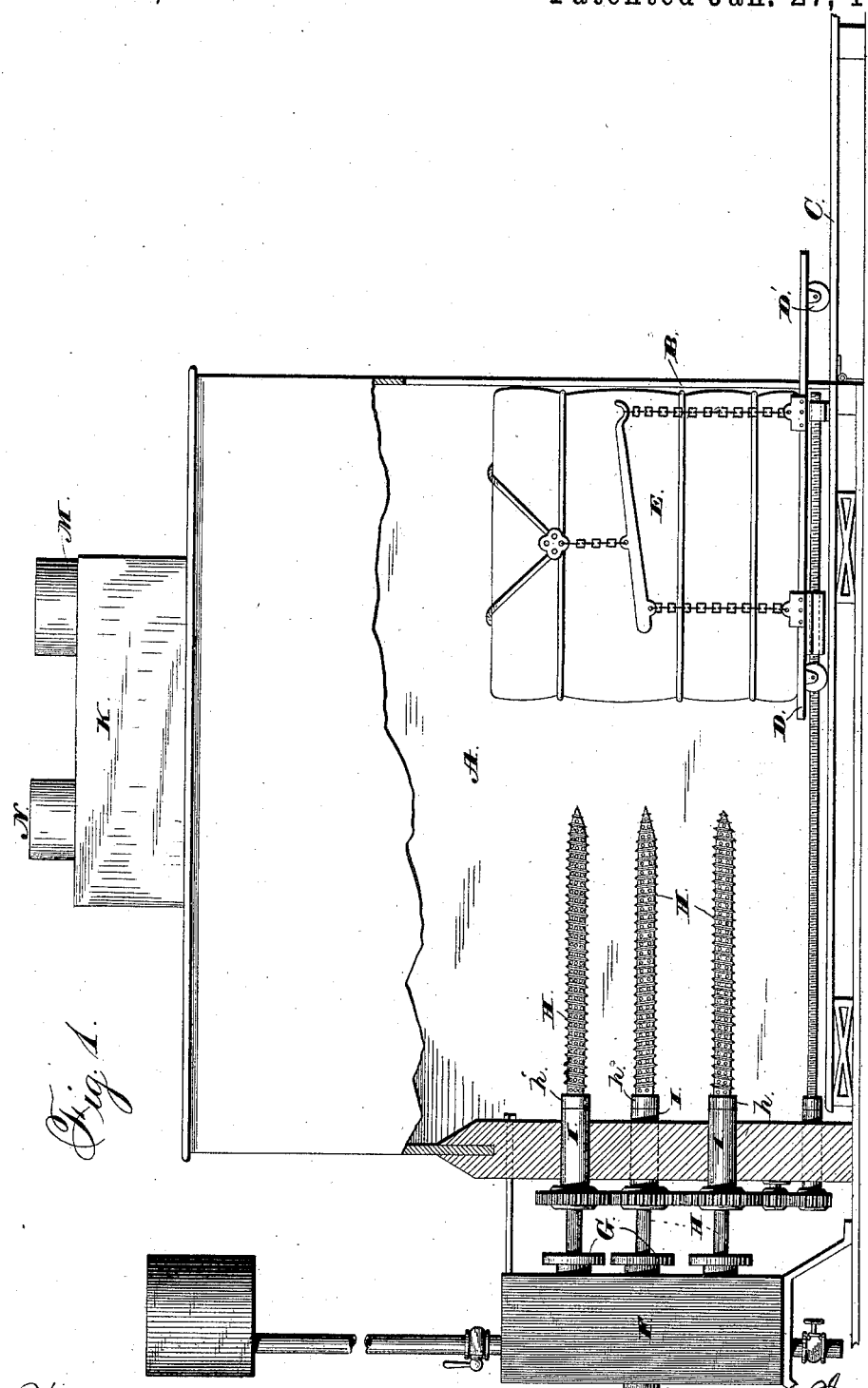
Figure 2:
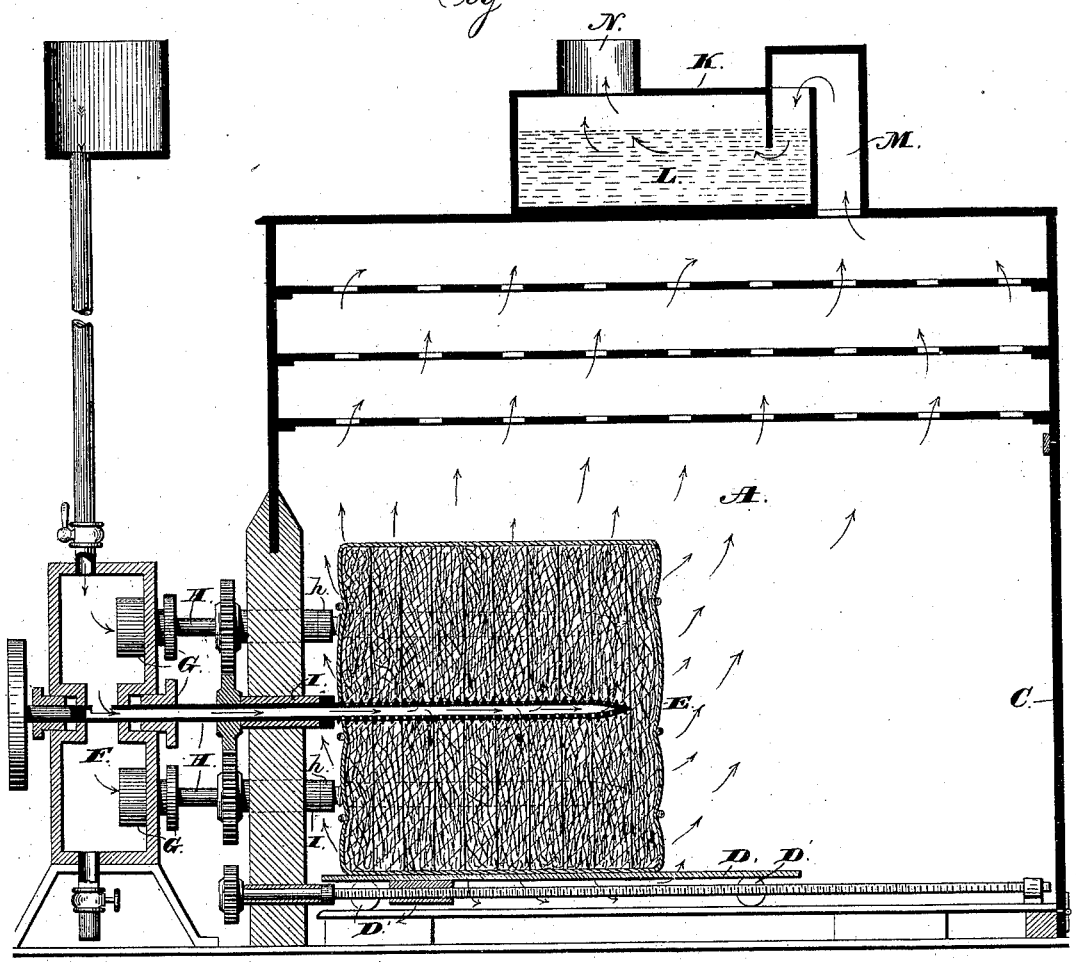
Figure 3:
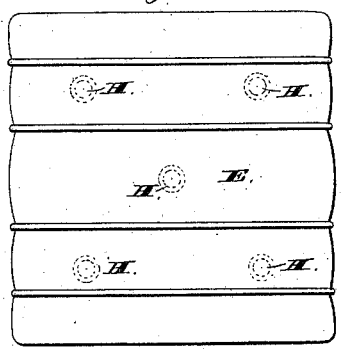

Figure 1 shows a view of one form of apparatus adapted for use in carrying out our process. Fig. 2 is a longitudinal sectional view of the same, showing a bale of fibrous material as being acted upon; and Fig. 3 is an end view of the bale, showing the relative positions of the injecting-tubes.

Letters of like name and kind indicate like parts in the several figures.

Fibrous materials in bales, and especially rags as imported from foreign countries, are, as is well known, often infected with and contain disease-germs. Where there are no disease-germs among the fibers there are often foul and decaying vegetable or animal matters capable of producing foul odors and disease when they are exposed to the air upon the unbaling of the material. It is, then, unsafe and dangerous to unbale fibrous materials imported from foreign ports without first disinfecting the same thoroughly to destroy the disease-germs and render harmless any vegetable or animal matter that may be among the fibers. Where there are disease-germs in the bale even loosening the same before disinfecting is dangerous, as such germs may be thereby set free to float about and cause disease not only in those directly handling the goods, but those in the neighborhood.

The expense and loss of time in unbaling the goods for disinfecting in a loose state and then baling them up again for transportation is a very great item, and one to be avoided, if possible.

The great danger to the public health, and the great expense and loss of time attendant upon unbaling or loosening of the baled material, make undesirable any process of disinfecting fibrous materials in the loose state.

In the case of rags imported from Egypt and other foreign countries it is especially desirable that some efficient, rapid, and thorough process of disinfecting should be devised. In order to meet the quarantine requirements, it must be thorough and certain in its action, and in order that the lives of the workmen and of others in the vicinity may not be endangered by the liberating of active disease-germs, or exposure of decaying and deleterious matters, and that the delay, trouble, and expense of unbaling and rebaling may be avoided, it must be capable of use upon the rags while in the bale, and of doing its work rapidly when so used.

The object of our invention is to provide such a process for disinfecting rags and other fibrous materials while in the bale or package without necessitating the opening or spreading thereof; and to this end our invention consists in the process as hereinafter specified.

In carrying out our process we prefer to use substantially the form of apparatus shown in the accompanying drawings, but do not limit ourselves to that or to any particular form or construction of mechanism or apparatus.

In the drawings, A designates a chamber provided at one end with an opening, B, to be closed by a door, C, hinged at its lower edge, and adapted, when swung outward and downward, as shown in Fig. 1, to form a continuation of the floor of the interior of the chamber. A car, D, supported upon suitable rollers or casters, D' D', is adapted to be run forward and back over the floor of the chamber, and when the door is swung down, as described above, out upon said door as a continuation of the floor. This car is shown provided with means for clamping and holding firmly a bale, E, of the material to be treated, and is caused to travel back and forth within the chamber and out through the door, when the latter is opened, by means fully shown and described in our application No. 144,555, filed by us October 2, 1884, and now pending.

Just beyond the closed inner end of the chamber A is another chamber or receptacle, F, into which is to be forced any desired kind of disinfectant gas or liquid under pressure. This liquid or gas can be forced or fed into chamber F and put under pressure in any desired way or by any preferred means. Through the forward wall of this chamber or receptacle, and through suitable stuffing-boxes, G, therein, pass the hollow rotary shafts H H, of any desired number, having their bores in communication with the interior of the chamber. As fully shown and described in our other application referred to, one of these shafts is continued through the other or rear wall of the chamber, and connected with suitable means for causing it to revolve in either direction, as desired. The hollow shafts pass forward through and are journaled in suitable long journal-bearings, I I, in the inner wall of the chamber A. The portions of the shafts within the chamber A are closed and pointed at their forward ends, screw-threaded throughout their lengths, and provided with series of small openings communicating with their central bores. Each shaft is formed with a collar, h, bearing against the inner or forward end of the shaft-bearing to prevent backward movement of the shaft. Just outside of the wall of chamber A the shafts are provided with intermeshing gear-wheels, so that when one of them is rotated, as indicated above, the others will be revolved an equal number of times. The threads of the screws are so constructed that as the main driven screw is turned so as to screw it into anything brought against its point the other screws will by their gears be turned to screw them in also.

As described in our other application referred to, the means for feeding forward the carriage with the bale fastened thereon is so connected with the gears on the shafts that the bale is fed against the ends of the revolving screws and then continuously forward or inward as they are screwed into it. After the perforated screws have been driven fully into the bale, the door having been previously shut to close the chamber A tightly, disinfectant gas or liquid—preferably gas—is forced into chamber F, and from there out through the series of screws projecting into the bale. The gas then passes out through the openings in the screws, and is forced to pass in every direction through the mass of the bale, so as to come into intimate contact with every portion thereof and effectually and thoroughly kill or destroy every germ among the fibers of the material.

As most fibrous materials, and especially rags, are baled so as to be in layers, we so place the bale to be treated on the carriage that the perforated screws shall penetrate it in directions at right angles to the layers, as shown best in Fig. 2. By so doing we insure that the gas or liquid used, issuing through the holes in the screws, shall pass in all directions throughout the bale, so as to come in contact with and act upon every portion of the material in every layer. When the material is in layers, if the screws were inserted into the bale in directions parallel with the layers, the gas or liquid would be apt to pass out between such layers as the screws projected between, thus leaving much of the material not properly acted upon. When, however, the bale is not stratified in its formation, the screws can be forced into it in any direction desired.

Upon the top of the chamber A is a receptacle or tank, K, containing disinfecting-liquid L. At one end of this tank a pipe, M, leads upward from the interior of chamber A to a point within the tank above the level of the liquid, and is then bent over and carried down into the liquid. A discharge opening or pipe, N, is provided on top of this tank at or near its end. With this construction all the air and gas passing up out of the chamber A as gas or liquid is forced into and through the bale must pass through the disinfectant-liquid in the tank K, so that any disease-germs contained or floating in it will be effectually killed or destroyed and rendered harmless. When a sufficient amount of disinfectant has been forced into and through the bale, the disinfectant is turned off and cold dry air is forced into the chamber or receptacle F, and from thence out through the perforated screws or nozzles and the bale.

Any desired means can be used for compressing and cooling the air and forcing it into the chamber. This air, passing through the bale, cools and dries it, and then, as it issues from the bale and fills the disinfecting-chamber, drives the foul air and gases from such chamber up and out through the disinfecting-liquid in tank K. Only a very short time is required to thus cool and dry the bale and drive out all the foul air from chamber A, so that it will be perfectly safe to open and enter the latter. The screws are caused to rotate, so as to be unscrewed or withdrawn from the bale, the carriage-moving mechanism being at the same time actuated so as to move the carriage backward and outward, so that the bale can be removed therefrom, all as set forth more fully in our other application hereinbefore referred to.

Our process as thus set forth herein is obviously adapted not only to kill and destroy effectually and completely all disease-germs, but also to destroy all foul and injurious gases and odors in the bale or arising therefrom. The decay of any vegetable or animal matter mingled with the material of the bale will be arrested, and such foul or deleterious matter rendered inert, harmless, and incapable of injury to the health of those handling the bale or the material thereof after the bale has been opened.

Instead of using perforated hollow screws, as described and shown, we contemplate using hollow perforated spindles to be thrust into the bale, either with or without rotary motion.

To sum up, by our process rags and other fibrous materials can be treated in bales, thus doing away entirely with the great danger of loosening and opening the bales and spreading the material, as has been necessary in the disinfecting processes heretofore known, and saving the time, labor, and expense necessary for unbaling and rebaling. The material is most thoroughly and effectually disinfected, every part of it being reached and acted upon by the disinfectant. The air and gases arising from the chamber and bale are thoroughly disinfected before reaching the open air, and the bale is cooled and dried, and all foul air and gases are entirely removed from the chamber before it is opened.

We contemplate using in our process any suitable form of disinfectant—as, for instance, sulphurous acid in the gas or in solution, hot air, superheated steam, carbolic acid, any of the well-known solutions or vapors containing chlorine or sulphur, or, if desired, a solution containing a very small portion of corrosive sublimate. When the disinfectant is in the form of a solution, it can be used as a liquid or mixed with air in the form of spray or vapor, which can be forced through the perforated nozzles into the bale.

We have enumerated above several kinds and forms of disinfectant which can be used, but we do not herein limit ourselves to them or to any particular form or kind of disinfecting agent.

Instead of injecting the disinfectant into the bale and causing it to permeate it outward, said disinfectant can be caused to pass inward into and be drawn off from within the mass of material. In carrying out this modified process the disinfectant is fed in any desirable way into the disinfecting-chamber around the bale, and the perforated tubular nozzles or screws having been previously inserted into the bale in the same manner as shown and described hereinbefore, a vacuum is produced by any desirable means in the chamber, with the interior of which the outer ends of the bores of the nozzles communicate, as described. The disinfectant within the disinfecting-chamber surrounding the bale will then be drawn inward through the bale to the perforated nozzles and out through them into the vacuum-chamber. From thence the gases and vapors are drawn off by any suitable means and passed through a disinfecting tank or apparatus of any well-known construction. The disinfectant, after a sufficient quantity of it has been drawn through the bale, is to be shut off and cool dry air admitted to the disinfecting-chamber instead, and also drawn in through the bale and out through the nozzles and a disinfecting tank or apparatus.

Instead of causing the disinfectant, and subsequently the cool air, to pass inward through the bale and thence out through the nozzles by suction, the disinfecting-chamber can be made strong enough to stand considerable pressure, and the disinfectant and afterward the air can be forced under pressure into it and around the bale. By such pressure the disinfectant or air can be caused to penetrate the bale from all sides inward to the perforated nozzles within it and then to pass outward through them. Either of these processes may be used, if desired; but we prefer the one first and most fully described herein, of which the others are mere modifications not involving any departure from our invention.

Having thus fully set forth the nature and merits of our invention, we claim—

1. The process of disinfecting rags or other fibrous materials while in the bale, which consists in inserting a perforated nozzle into the bale at an angle to the layers of material therein and then causing a disinfectant to pass through the nozzle and out through the perforations thereof, substantially as and for the purpose described.

2. The process of disinfecting rags and other fibrous materials, which consists in forcing into a bale thereof at right angles to the layers of materials in the bale a series of perforated tubular nozzles and then forcing through the nozzles and the perforations a disinfectant, substantially as described.

3. The process of disinfecting rags and other fibrous material, which consists in placing the material while in the bale in a suitable chamber, then screwing into the bale at right angles to the layers of material in the bale a series of perforated tubular screw-nozzles, and then forcing through such nozzles a disinfectant, substantially as and for the purpose described.

4. The process of disinfecting rags and other fibrous materials, which consists in forcing a disinfectant into and through the material while in the bale and then forcing into and through the bale cold air, substantially as and for the purpose set forth.

5. The process of disinfecting rags and other fibrous materials while in the bale, which consists in placing the bale in a closed chamber, then injecting into the interior of the bale a disinfectant under pressure, then turning off the disinfectant and forcing into the interior of the bale dry cold air in sufficient quantity to cool the bale as it passes out through it and to drive out the foul air and gases from the chamber, substantially as described.

In testimony that we claim the foregoing we have hereunto set our hands this 20th day of October, 1884.

SAMUEL WEBBER PARKER.
  HENRY BLACKMAN.

Witnesses:
  FRANK M. CLUTE,
  WM. H. SHELP.